United States Patent [19]
Alpert et al.

[11] Patent Number: 5,166,109
[45] Date of Patent: Nov. 24, 1992

[54] UTILIZATION OF SLAG FROM COAL GASIFICATION SYSTEMS

[75] Inventors: Seymour B. Alpert, Los Altos, Calif.; Donald Meisel, Spring, Tex.; Vas Choudhry, Fremont, Calif.

[73] Assignee: Electric Power Research Institute, Palo Alto, Calif.

[21] Appl. No.: 781,583

[22] Filed: Oct. 23, 1991

Related U.S. Application Data

[62] Division of Ser. No. 503,985, Apr. 4, 1990.

[51] Int. Cl.$^5$ ............... C04B 35/00; C04B 18/06; C04B 7/14
[52] U.S. Cl. ............... 501/155; 501/141; 106/697; 106/705; 106/706; 106/707; 106/789; 106/790
[58] Field of Search ............... 501/155, 141; 106/624, 106/679, 705, 707, 714, 789, 697, 706, 790

[56] References Cited

U.S. PATENT DOCUMENTS

| | | | |
|---|---|---|---|
| 300,593 | 6/1884 | Gebb | 501/155 |
| 1,580,906 | 4/1926 | Korber | 501/155 |
| 1,746,860 | 2/1930 | Lloyd | 501/155 |
| 2,055,706 | 9/1936 | Ramseyer | 106/11 |
| 2,247,120 | 6/1941 | Fitzgerald | 106/73 |
| 2,576,565 | 11/1951 | Brown et al. | 106/39 |

FOREIGN PATENT DOCUMENTS

| | | |
|---|---|---|
| 188371 | 1/1986 | European Pat. Off. |
| 589558 | 11/1924 | France . |
| 7144454 | 12/1971 | France . |
| 1-037447 | 2/1989 | Japan . |
| 1-122944 | 5/1989 | Japan . |

OTHER PUBLICATIONS

TCGP Licensee Technical Exchange Meeting "Solid Disposal And Its New Applications", Oct. 20-22-1987.

*Primary Examiner*—William R. Dixon, Jr.
*Assistant Examiner*—Michael Marcheschi
*Attorney, Agent, or Firm*—Sixbey, Friedman, Leedom & Ferguson

[57] ABSTRACT

A low density aggregate product and method for making the same utilizing coal ash slag resulting from a typical coal gasification system wherein the resulting aggregate product has a lower density than the initial coal ash slag. The coal ash slag is combined with a small amount of a binder and then fired for a predetermined time and temperature to produce the aggregate. Also, by heating the coal ash slag and binder, a gaseous efflux is emitted to form interlaced channels throughout the aggregate which have a characteristic length and diameter.

7 Claims, 4 Drawing Sheets

UTILIZATION OF SLAG FROM COAL GASIFICATION SYSTEMS

This is a divisional application of Ser. No. 07/503,985, filed Apr. 4, 1990.

BACKGROUND OF THE INVENTION

1. Technical Field of the Invention

This invention relates to an aggregate and method for making the same which utilizes coal ash slag from coal gasification systems. More particularly, the present invention relates to a lightweight aggregate having a lesser density than the coal ash slag from which it was formed allowing for its use as a structural material. Further, the processed aggregate includes interlaced channels of characteristic diameter and length which allow for its use in chemical filtering or reaction processes.

2. Description of the Prior Art

Several coal gasification systems have been developed over the past decade. These entrained coal gasification systems feature the partial combustion of coal using an oxidant resulting in the production of synthesis gas (syngas). To date, such systems have not generally been commercially attractive, because they have typically had higher operating costs than other existing conventional processes.

Specifically, in these processes all or substantially all of the carbon found in the coal is reacted at an elevated temperature and at an elevated pressure to form the desired syngas. Systems vary with respect to methods for feeding the coal; i.e., coal-water slurry systems and dry feed systems. In these systems the reaction temperature is above the melting point of the ash present in the coal fed to the system. Therefore, the ash is molten to allow the oxidant to react with the carboneous material.

When the desired reaction has occurred, typically, the flowing stream of gases and molten ash is rapidly cooled by quenching in a liquid pool of water. The slag produced by standard coal gasification systems has been shown to be relatively dense, impervious to leaching and relatively inert. The slag material is continuously removed from the system by equipment that permits an intermittent or continuous let down of the slag-water by-product from the elevated pressure of the particular system. Once removed, the slag must be disposed of in a safe and suitable manner. This step further adds to the total cost of producing syngas.

Historically, utilization of solid waste materials from chemical processing of feedstocks has received limited attention. Recently, somewhat greater effort is being made to utilize coal combustion waste products (fly ash) due to the increasing costs of disposal and the limited availability of land for this purpose, particularly in areas of high population density. At present, coal combustion waste materials are utilized to a far greater degree in Europe than in the U.S.

There are a number of methods for utilizing waste ash material produced from coal-burning industrial power plants. Illustrative of such methods is U.S. Pat. No. 2,576,565, issued Nov. 27, 1951 to Brown, which discloses a ceramic product and method of making the same which utilizes coal ash from coal burning power plants collected from stack gases and slag produced from the cooled molten coal ash. The ash used in this process possesses properties at least equivalent to conventional clay or shale useful for producing a ceramic product. Therefore, once the ash has been screened to the desired size, it may be used directly as a raw material for the ceramic product.

Further patents illustrative of methods of producing ceramic products using coal ash resulting from coal burning plants are U.S. Pat. Nos. 1,580,906 issued Apr. 13, 1926 to Korber; 2,055,706 issued Sep. 29, 1936 to Ramseyer; and 2,247,120 issued Jun. 24, 1941 to Fitzgerald.

Another example of utilizing coal ash produced by coal burning power plants is set forth in U.S. Pat. No. 300,593, issued Jun. 17, 1884 which discloses a concrete pavement wherein a small amount of coal ash is combined with other ingredients to form the concrete mixture. However, the coal ash is only present in the mixture in a small amount which translates into a minimal reduction in the slag by-product of the system.

Consequently, there is a pressing need for a process which will utilize coal ash slag discarded as waste from coal gasification processes, and to create a product for which there is a commercial market. Further, with the ever present threat of rising fuel prices and the current abundance of coal, there is a need for a method which will allow coal gasification systems to be more economical and useful as a future fuel producing source.

SUMMARY OF THE INVENTION

Therefore, it is an object of the present invention to provide a lightweight aggregate and a method producing the same which will utilize coal ash slag resulting from coal gasification systems in a cost effective and simplistic manner.

Another object of the present invention is to provide a lightweight aggregate useful as a structural material which is produced by firing a mixture including a substantial amount of coal ash slag removed from a coal gasification system and a minor amount of a suitable binder wherein the aggregate produced has a density less than the component coal ash slag.

Still another object of the present invention is to provide a lightweight aggregate useful as a porous structure which is produced by firing a mixture including a substantial amount of coal ash slag removed from a coal gasification process and a minor amount of a suitable binder wherein the porous aggregate includes interlaced channels having a characteristic diameter and length.

Yet another object of the present invention is to provide a method for producing a lightweight aggregate useful as a structural material including coal ash slag resulting from coal gasification wherein the aggregate produced is of a lesser density than the component coal ash slag, the method including the steps of screening the coal ash slag, recovering excess char from the screened coal ash, crushing the oversize particles removed by the screening process and re-combining the crushed particles with the slag mixing the slag with an appropriate amount of a binder slag, extruding or pelletizing the slag and binder to form a pre-aggregate, drying the pre-aggregate, firing the pre-aggregate and finally sealing the surface of the aggregate to form a final product.

These, as well as other advantages of the present invention, are achieved by combining glassy coal ash slag produced as a by-product from a standard coal gasification system with a binder. The binder may be a readily available clay, such as bentonite, present in the aggregate at approximately 2-10% of the mixture. The coal ash slag is processed through a series of steps which result in an aggregate which has a lesser density or weight than the original coal ash slag. The lower density allows for its use as a component in a number of structural materials such as mortar, cement, lightweight concrete blocks, etc. The aggregate is also characterized by interconnected channels having a particular characteristic diameter and length. Furthermore, as a result of this porous structure, the aggregate may also be useful in chemical processes as a means for chemical fixation, as a filter aid, or as a porous soil amendment material.

Further objects of the subject invention will become apparent from the following description of the preferred embodiments.

DETAILED DESCRIPTION OF THE PREFERRED EMBODIMENT

Several advanced coal gasification systems have been developed in recent years, primarily in response to threatened future shortages of oil and gas and the need for clean uses of coal which do not emenate a significant amount of sulfur compounds into the atmosphere resulting in acid rain. Despite apparent superiority in environmental emissions, and other areas, the process has not been commercially attractive, because operating costs are typically higher than for existing conventional processes. The system in accordance with the present invention set forth a solution for reducing those net operating costs.

Specifically, one cost of production associated with such systems is the costs of disposing of the large amount of coal ash slag which is produced as a result of combusting coal with oxidant to produce the synthesis gas. The coal ash slag is a glassy by-product which is relatively dense, impervious to leaching and relatively inert. These characteristics make subsequent use of the slag very limited. It is the process of transforming the dense, glassy slag produced from a typical coal gasification system into a commercially desirable form having a reduced density and weight which constitutes the essence of the present invention.

Conventional lightweight aggregates (LWA) are generally produced by thermal processing of naturally occurring expandable materials such as shales and clays. Other naturally occurring materials of lower strength and/or quality that are used as lightweight aggregates include volcanic ash and cinder and pumice stone. Lightweight aggregates, aside from having lower unit weights, provide better insulation and are more resistant to fire damage than conventional aggregates. Major applications of these aggregates are in the production of lightweight structural concrete and lightweight precast concrete products such as roofing tiles, masonry blocks, utility vaults for underground power cable connections, and cement concrete pipes, etc.

Figure 1:
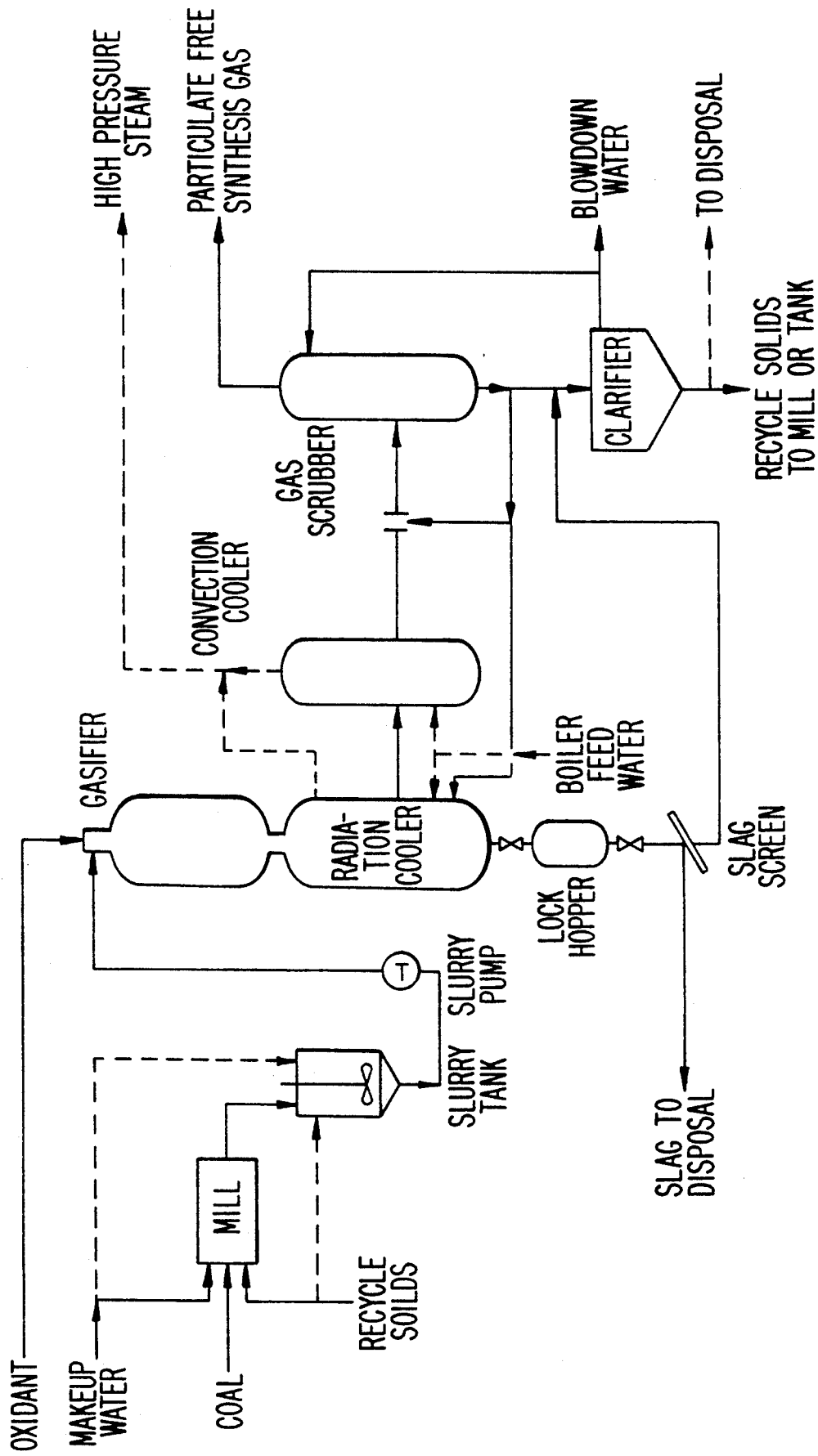
FIG. 1 is an example of a typical coal gasification process.
Figure 2:
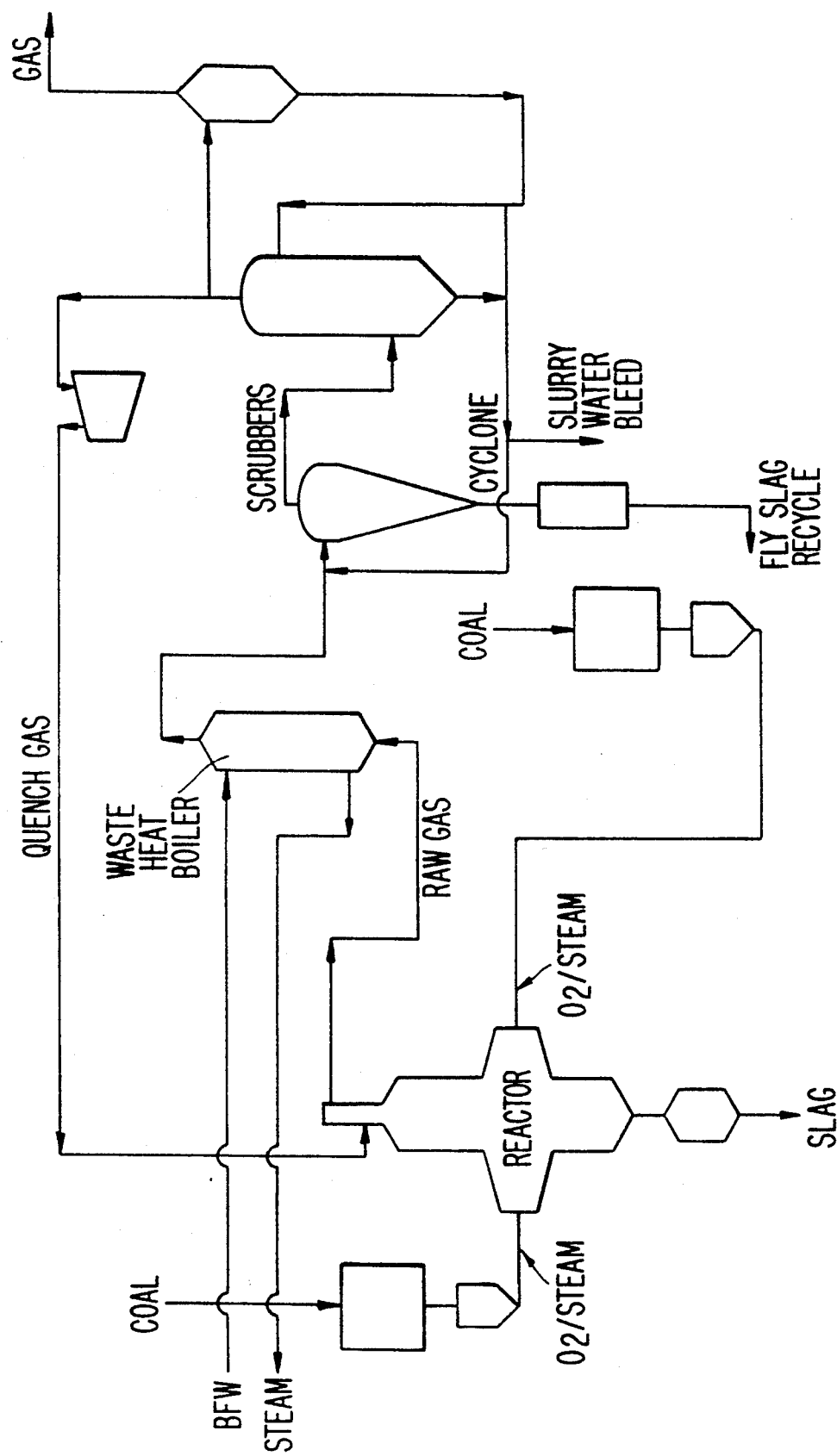
FIG. 2 is a further example of a typical coal gasification process.

In accordance with the present invention, typical coal gasification systems involve partial combustion of coal using an oxidant to produce synthesis gas consisting primarily of hydrogen and carbon monoxide. In these processes all or substantially all of the carbon in the coal is reacted at an elevated temperature in the range of 900°-1400° C. and at an elevated pressure in the range of 20-200 atm., using nozzles to inject the coal and the oxidant to form the desired synthesis gas. The reaction time for this process is typically 1-5 seconds. Systems vary with respect to the specific methods for feeding the ground coal, examples of such are coal water slurry systems or dry feed systems. FIGS. 1 and 2 illustrate schematically typical coal gasification systems.

In the typical process the reaction temperature is maintained above the melting point of the ash present in the coal that is fed to the system. Thus, the ash is in a molten state, as discussed previously which allows the oxidant to react with the carbonaceous material and reach near complete combustion. Once the desired reaction has been accomplished, the flowing stream of gases and molten ash are rapidly cooled by quenching the stream of fluid in a liquid pool of water maintained at a low temperature; e.g., approximately 315° C. On contact with the pool, the syngas is liberated and the ash is cooled to form a dense, glassy slag.

Figure 3:
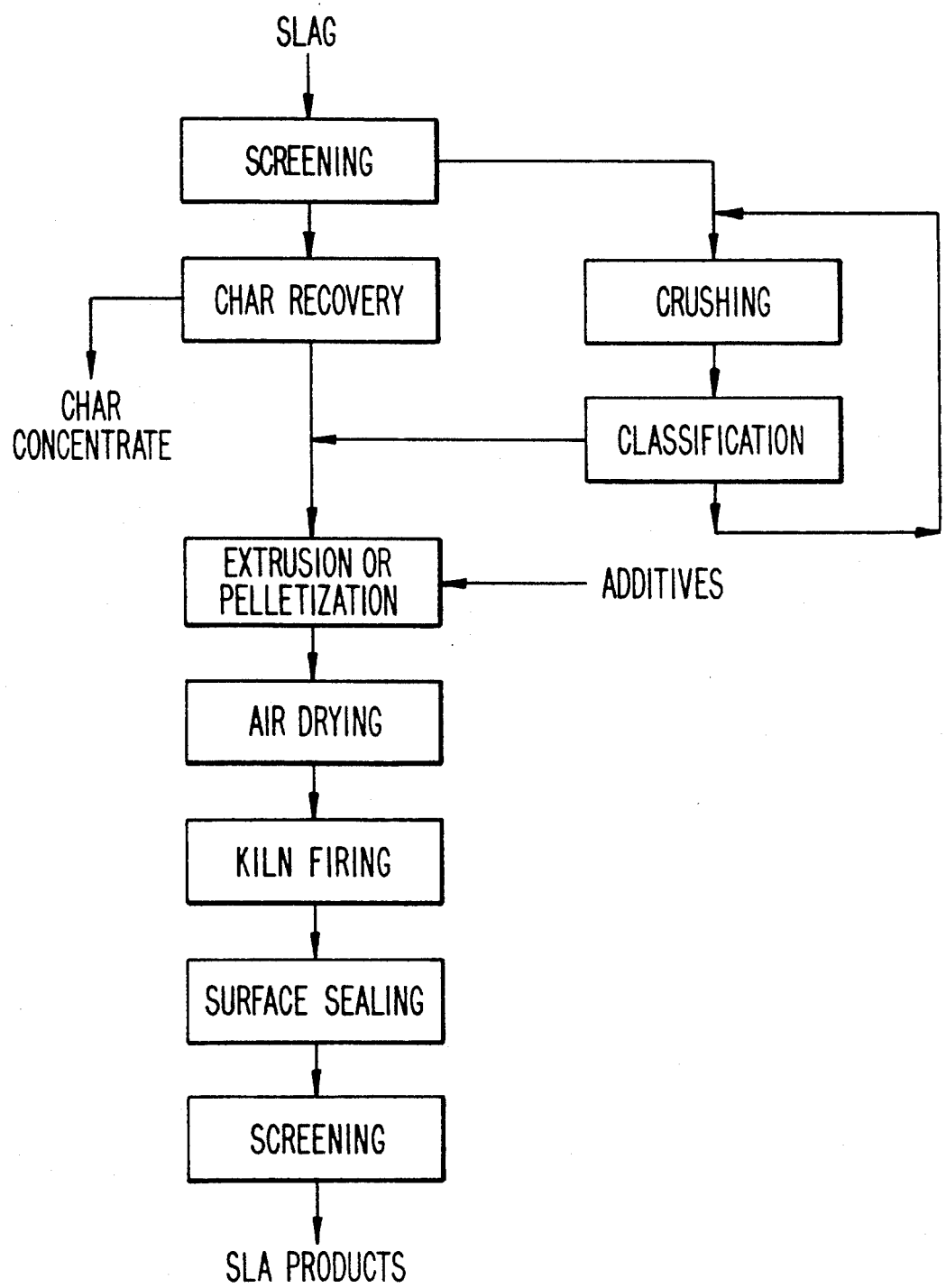
FIG. 3 is a simple flowsheet representation of the slag utilization process of the subject invention.

FIG. 3 illustrates a flowchart representation of the steps carried out in accordance with the present invention. Initially, the coal ash slag is screened to provide a desired aggregate particle size. The acceptable particulate size will be directly dependent upon on the commercial use of the resulting aggregate. As can be noted, oversized particles are separately crushed and classified in a closed-circuit crushing operation, with these particles being re-combined with acceptable size particles. The screened particles may be processed through a char recovery step to recover excess char (carbon) from the slag which may in some instances reduce the final strength of the resultant aggregate. Complete char recovery is not, however, essential or even desired as examples hereinafter provided will demonstrate.

Studies of coal gasification systems have shown that achieving higher than 99% carbon conversion is difficult and that it is extremely costly to convert that small amount of carbon which remains. The additional costs result from additional energy and oxygen needed to convert the remaining small amount of carbon which is generally refractory. This additional conversion during the coal gasification process is not required when utilizing the subject invention and is actually beneficial in that the small amount of carbon remaining in the slag provides the necessary energy required to soften the slag during the firing step discussed below. Studies have shown carbon conversions of 93% to 99% are suitable in carrying out the subject invention and result in fuel savings during the firing step.

Four tests were conducted to determine the effects of char content on the compression strength of sintered pellets formed in accordance with the subject invention. The parameters set forth in Table 1 below were used in carrying out each test.

TABLE 1

| CHAR CONTENT TEST CONDITIONS | | | | |
|---|---|---|---|---|
| TEST | GRIND | BINDER | RESIDENCE TIME | SINTER TEMPERATURE. °F. |
| 1 | 65 Mesh | 5% | 5 MIN | 1900 |
| 2 | 65 Mesh | 5% | 10 MIN | 1900 |
| 3 | 16 Mesh | 5% | 5 MIN | 1800 |

TABLE 1-continued

CHAR CONTENT TEST CONDITIONS

| TEST | GRIND | BINDER | RESIDENCE TIME | SINTER TEMPERATURE, °F. |
|------|-------|--------|----------------|-------------------------|
| 4 | 16 Mesh | 5% | 10 MIN | 1800 |

The density and compression strength were measured for each test condition at 1%, 6.4%, and 12.4% char content. The results of these measurements are tabulated below in Table 2.

TABLE 2

EFFECT OF CHAR CONTENT ON SINTERED AGGREGATE

| | TEST #1 | TEST #2 | TEST #3 | TEST #4 |
|---|---|---|---|---|
| 1% CHAR | | | | |
| DENSITY (g/cc) | 1.29 | 1.50 | 1.00 | 0.94 |
| STRENGTH (kg) | 25.6 | 41.0 | 10.7 | 18.1 |
| 6.4% CHAR | | | | |
| DENSITY (g/cc) | 1.52 | 1.57 | 0.97 | 1.02 |
| STRENGTH (kg) | 21.8 | 41.8 | 6.8 | 17.0 |
| 12.4% CHAR | | | | |
| DENSITY (g/cc) | 1.48 | 1.63 | 0.95 | 1.13 |
| STRENGTH (kg) | 11.0 | 14.8 | 3.1 | 7.0 |
| 6.4% TO 12.4% CHAR RELATIVE % CHANGE | −50% | −65 | −54% | −59% |

As shown by Table 2, there is little difference between the 1% and 6.4% Char Content Tests. However, the relative change between 6.4% and 12.4% char content was found to be quite substantial. The above test results demonstrate the need for a char recovery step in the subject process where the char content of the coal ash slag is greater than approximately 7%.

In accordance with the present invention, before firing of the slag, the slag is combined with an appropriate amount of a binder and water. The mixture is then agglomerated by extrusion or pelletization to form a pre-aggregate component. The final selection of the agglomeration method depends on the cost and availability of a binder. The binder may be any conventional, readily available clay such as bentonite. The binder is preferably present at about 2-10% of the total pre-aggregate. Following this combination, the pre-aggregate is air dried to reduce firing time and improve the aggregate strength.

Figure 4:
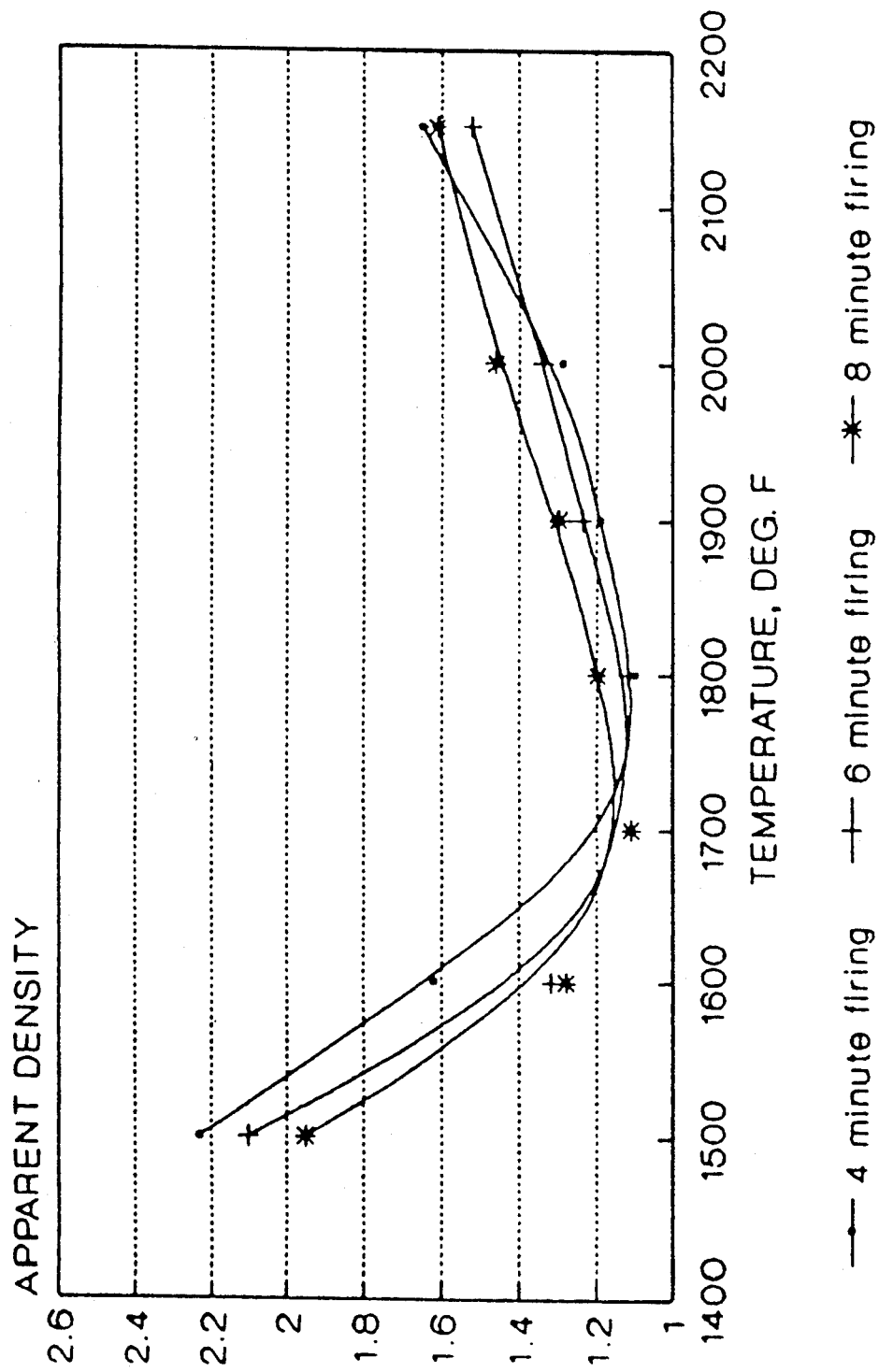
FIG. 4 is a graphical illustration of the density of the aggregate product when the slag is fired at different times and temperatures.

The firing step is preferably conducted in a commercially available kiln. A rotary kiln is recommended because of its flexibility and capability to produce aggregate products with differing specifications. The duration of the firing step has been shown not to be of particular significance in the overall process. Test results have shown the preferable range to be 4 to 10 minutes. The preferred temperature for firing the pre-aggregate is in the range of 1600° F. to 1900° F. As can be seen from FIG. 4, the effects of different firing times and temperatures on the resulting density of the aggregate product are set forth. It can be noted, that in each case, the minimum apparent densities were observed at a temperature range between 1700° and 1800° F.

After firing, the resulting aggregate is surface sealed with an appropriate oxide sealer to avoid water absorption. Preferably, silicon oxide is used in the sealing process. Finally, the aggregate may again be screened to provide a desired resultant product size. The necessity for this final step will greatly depend upon the specific uses and requirements of the resultant product.

In forming the low density aggregate, it has been discovered that the required firing temperatures apparently permit the emission of a gaseous efflux through the softened material. The efflux causes the structure of the aggregate to develop interlaced channels having a characteristic diameter and length. It is believed these channels result from the melting of the coal ash in the coal gasification system. Water from hydration and carbon dioxide from the calcination of carbonates formed during the melting of the coal ash in the coal gasification process are subsequently removed during the firing step of the subject invention. This removal produces the resulting porous structure. Thus, the coal gasification system is integral in forming a specific type of material which may be fired to form the desired product of the subject invention.

The low density aggregate product may be used for a number of specific purposes, such as:
light weight concrete blocks
light weight structural concrete
other precast products
mineral admixture time for cement concrete
chemical or waste fixation
blended hydraulic cement
industrial fillers and filter aids
porous soil amendment material
catalyst support having a preferred pore structure
water proofing boards In order that those skilled in the art to which the present invention pertains may better understand the present invention, such will now be particularly illustrated by the following examples which are shown only by way of illustration and are not to be limiting of the present invention.

EXAMPLE 1

Example 1 relates to the use of a 28 mesh grind, low density aggregate made in accordance with the subject invention as a substitute for concrete sand in a mortar mix. Specifically, three mixes were made. The first contained 40% by volume aggregate and 60% concrete sand, the second contained 100% aggregate and the third or Standard Mix contained 100% concrete sand. All three mixes also contained 6 sacks/cu yd of cement and 1.2 sacks/cu Yd of lime. The results, tabulated below in Table 3, show mix 1 and mix 2 had 7-day and 28-day strengths of equal to or greater than that of the Standard Mix, while the unit weight of Mixes 1 and 2 were substantially lower than the unit weight of the Standard Mix.

TABLE 3

MORTAR MIX TEST RESULTS

| | SLA MIX No. 1 | SLA MIX No. 2 | STANDARD Mix |
|---|---|---|---|
| SLA fine aggregate (by volume) 28 mesh grind | 40% | 100% | 0% |
| Concrete sand | 60% | 0% | 100% |
| Cement (sacks/cu yd) | 6 | 6 | 6 |
| Lime (sacks/cu yd) | 1.2 | 1.2 | 1.2 |
| 7-day strength (psi) | 1450 | 1340 | 1340 |
| 28-day strength (psi) | 2450 | 2470 | 2390 |
| Unit weight (pcf) | 117 | 91 | 134 |
| Test pellet strength (kg) | 16.1 | 23.3 | — |

EXAMPLE 2

Example 2 relates to lightweight cement concrete wherein two mixes were compared, as in Example 1, for strength and unit weight. For this test, extruded low density aggregate made in accordance with the subject invention was combined with concrete sand to form Mix 1 wherein the aggregate was present in the amount of 60% by volume. The Standard Mix contained 60% coarse rock and 40% concrete sand. The size range of the low density aggregate and the rock is included below in Table 4. Also, as in Example 1, 6 sacks/cu yd of cement were used in each mix. The strength measurements for Mix 1 were lower than those for the Standard Mix. However, depending upon the aggregate product's use requirements, it may be sufficiently strong. Table 4 summarizes these results.

TABLE 4

LIGHTWEIGHT CEMENT TEST RESULTS USING EXTRUDED AGGREGATE

|  | Mix 1 | STANDARD Mix |
|---|---|---|
| Coarse aggregate (by volume) | 60% | 60% |
| Size range | ⅜", 7/16" 5/16" (slag grind: 48 mesh) | ⅜" × 5/16" (rock) |
| Concrete sand | 40% | 40% |
| Cement (sacks/cu yd) | 6 | 6 |
| 7-day strength (psi) | 2400 | 3120 |
| 28-day strength (psi) | 3100 | 4720 |
| Unit weight (pcf) | 105 | 142 |
| Test pellet strength (kg) | 33.2 | — |

In each of the above examples, slag from several coal sources that have been processed in entrained gasification systems of varying configuration and which exhibit expansion when heated to 1600°–1900° F. for 4 to 8 minutes may be used in accordance with the present invention. However, ash from conventional pulverized coal fired operations will not expand on being heated using the above described process.

Various additional uses for the low density aggregate may be available in addition to those mentioned above. Accordingly, the foregoing detailed description of the invention and examples are considered exemplary in nature, and it should be appreciated by those skilled in the art that the invention may be practiced otherwise than as specifically described herein without departing from the spirit and scope of the invention. It is, therefore, to be understood that the spirit and scope of the present invention be limited only by the appended claims.

Industrial Applicability

Synthetic lightweight aggregate (SLA) may be used in a variety of applications. Major applications of SLA may be found in the production of lightweight structural concrete and lightweight precast products such as roofing tiles, masonry blocks, utility vaults for underground power cable connections, cement concrete pipes and lightweight concrete masonry units.

We claim:

1. An aggregate useful as a structural material utilizing coal ash resulting from coal gasification, said aggregate produced by firing a mixture consisting of said coal ash slag and a binder and water for 4–10 minutes and at a temperature within the range of 1600°–1900° F. wherein said aggregate produced is less dense than said coal ash slag and said binder is present in said aggregate in an amount in the range of 2–10%.

2. An aggregate, as set forth in claim 1, wherein said binder comprises 5% of said aggregate.

3. An aggregate, as set forth in claim 1, wherein said aggregate is a clay.

4. An aggregate, as set forth in claim 3, wherein said clay is bentonite.

5. An aggregate useful as a porous structure utilizing coan ash slag resulting from coal gasification, said aggregate produced by firing a mixture consisting of said coal ash slag and a binder and water for 4–10 minutes and at a temperature within the range of 1600°–1900° F. wherein said aggregate is porous and includes a plurality of interlaced channels and said binder is present in said aggregate in an amount in the range of 2–10%.

6. An aggregate, as set forth in claim 7, wherein said binder comprises 5% of said aggregate.

7. An aggregate, as set forth in claim 5, wherein said aggregate is a clay.

* * * * *